UNITED STATES PATENT OFFICE.

ALBERT G. MEYER, OF SAN FRANCISCO, CALIFORNIA, ASSIGNOR OF TWO-FIFTHS TO HENRY R. NEWBAUER, OF SAN FRANCISCO, CALIFORNIA.

PROCESS OF TREATING CREOSOTE AND PRODUCT THEREOF.

No. 856,975.     Specification of Letters Patent.     Patented June 11, 1907.

Application filed November 8, 1904. Serial No. 231,894. (Specimens.)

*To all whom it may concern:*

Be it known that I, ALBERT G. MEYER, a citizen of the United States, residing at San Francisco, in the county of San Francisco and State of California, have invented certain new and useful Improvements in Processes of Treating Creosote and Product Thereof, of which the following is a specification.

The object of this invention is to so transform creosote that it can be used in sufficiently large doses hypodermically to produce a sufficient therapeutic effect in different diseases, such as diphtheria, tuberculosis, asthma, and in other acute and infectious diseases; also so that it can be used as a local antiseptic and germicide.

The process is as follows: Into a glass or other receptacle is placed 60 minims of beechwood creosote, and 150 grains of acetanilid is gradually and thoroughly mixed with the creosote so as to form a paste. To this paste is added, and thoroughly worked in, about 30 grains of carbonate of ammonium; the result of this mixture is a rather soft grayish paste. To this is added 30 minims of chemically pure nitric acid, the acid and paste being brought into complete contact by stirring with a glass rod. After effervescence has about subsided, usually in one or two minutes, the resultant brownish semi-solid mass is emptied into a large test tube, and to it is added 5 drams or 300 minims of cold water. This is brought to a boil and allowed to boil slowly for three minutes. Then to this, while it is still hot, is added 120 minims of alcohol. The tube is then returned to the flame and a further boil of two minutes given. The contents of the tube are now immediately thrown into a suitable receptacle and allowed to stand in a cool place for at least five hours; it then has become separated into two parts, one a solid mass of crystals and the other of liquid. The liquor is then poured out of the receptacle and the crystals are thrown on an absorbent pad of blotting paper which takes up all the liquor clinging to the crystals. After remaining on the pad for some hours the crystals are placed in a test tube and more than covered with cold water, the tube being well shaken for a few minutes and then allowed to remain stationary for a time sufficient to cause the crystals to settle at the bottom of the tube, when the liquor is carefully allowed to run off leaving the crystals behind. This washing of the crystals may be repeated one or more times. The form of these crystals is that of large crystalline plates, yellowish to reddish brown in color. These are readily soluble in alcohol and ether, with difficulty soluble in cold water, somewhat more soluble in hot. They yield a strong odor of creosote. The crystals begin to soften at 105° C. and are completely melted at 110° C. Analysis shows this crystalline product to be composed of crystals of acetanilid impregnated with creosote, nitro-derivatives of the constituents of creosote, and a trace of resin, the proportions being, acetanilid 90%, and creosote, nitroproducts and resin 10%. The nitroproducts form much less than one half of the 10% and contain various nitro-derivatives, such as, picric acid (trace), nitrocresols, nitroxylenols, nitroguaiacols, etc. Since the product is an indefinite mixture of many substances, it is impossible to assign to it any definite chemical composition or construction.

The reactions which occur are in two directions: First, between the nitric acid and ammonium carbonate, which, considering the ammonium carbonate as a normal salt, may, of course, be formulated thus:

$$2HNO_3 + (NH_4)_2CO_3 = 2NH_4NO_3 + H_2O + CO_2.$$

Secondly, between the nitric acid and the creosote. In considering this second reaction it must be remembered that ordinary beechwood creosote is a complex mixture of phenoloid bodies, containing among other substances, phenol $C_6H_5OH$, cresols, $C_6H_4(CH_3)(OH)$, xylenols, $C_6H_3(CH_3)_2(OH)$, guaiacol, $C_6H_4(OCH_3)(OH)$, and creosol, $C_6H_3(CH_3)(OCH_3)(OH)$. An analysis of beechwood creosote gave for example the following results: Monophenols 39%, guaiacol 19.72%, cresol & homologues 39.98%, loss 1.30%. In one hundred parts of the monophenols there are present—Phenol 1?%, o-, m-, and p-, cresols 56%, o-ethyl phenol 9%, xylenols 7.5%. The action of the nitric acid upon this complex mixture is in two general directions, in one case nitro-derivatives are produced, in the other the nitric acid acts as an oxidizing agent, giving rise to such products as oxalic acid, carbon dioxid, etc. Only the nitro products, however, concern us, since these alone remain in the product obtained. Further it is to be noted that the amount of nitric acid employed is sufficient only partially to act upon the creosote, so that a large excess of the latter remains unaffected. The process of nitration being in a general way the same in the various constituents of creosote. The general reaction may be illustrated by the actions of concentrated nitric acid in phenol, viz., $$\underset{\text{Phenol}}{C_6H_5OH} + 3HNO_3 = \underset{\text{Picric acid}}{C_6H_2(NO_2)_2OH} + 3H_2O.$$

The acetanilid is not chemically changed in the general reaction. The alcohol is used simply to facilitate the crystallization and in no way modifies the action. The acetanilid is neutral, the creosote weakly acid, the nitro-products as a rule more strongly acid. The color is due in part to the nitro products, in part to the presence of a trace of resin.

The crystalline product thus obtained is used in the following manner.

To any desired part of the crystals is added an equal quantity of diluted alcohol, consisting of one part of alcohol to an equal part of distilled water. This is brought to a boil in the test tube and is boiled for a few seconds so as to make a complete solution. To two drams or 120 minims of this solution is added 12 minims of chemically pure ether. It is now ready for use. It is used hypodermically in which case the dose varies from 30 to 160 minims of the alcohol-ether solution according to the severity and character of the case and the age of the patient. It is also used as a local application.

I claim:—

1. The process of treating creosote which consists in mixing therewith a suitable proportion of acetanilid to form a paste, adding to said paste a suitable proportion of carbonate of ammonium, and then adding thereto a suitable quantity of pure nitric acid, adding water and boiling the mixture, then adding alcohol and then again boiling the mixture, allowing the same to cool until it separates into a liquid portion and a crystalline portion, separating the crystals, washing the crystals, and dissolving the same in dilute alcohol, substantially as described.

2. The process which consists in reacting on creosote with acetanilid, then adding thereto carbonate of ammonium and nitric acid in suitable proportions and then reducing the product to a crystalline form, substantially as described.

3. The composition of matter, comprising creosote and acetanilid substantially in the proportions specified, readily soluble in alcohol or ether, slowly soluble in cold water, more soluble in hot, yielding a strong odor of creosote, the crystals melting at about 110° C. substantially as described.

In witness whereof I have hereunto set my hand in the presence of two subscribing witnesses.

ALBERT G. MEYER.

Witnesses:
FRANCIS M. WRIGHT,
BESSIE GORFINKEL.